United States Patent Office 3,511,886
Patented May 12, 1970

3,511,886
TRIPOLYMER OF STYRENE OR INDENE, BUTADIENE AND A NORMAL ALPHA-OLEFIN HAVING 10 TO 24 CARBON ATOMS
Thomas J. Clough, Glenwood, and David W. Young, Homewood, Ill., assignors to Sinclair Research, Inc.
No Drawing. Original application Apr. 11, 1963, Ser. No. 272,217, now Pat. No. 3,393,057, dated July 16, 1968. Divided and this application Dec. 15, 1967, Ser. No. 721,890
Int. Cl. C07c 15/00
U.S. Cl. 260—669       3 Claims

ABSTRACT OF THE DISCLOSURE

A normally liquid tri-polymer of 2.5–35% by weight styrene or indene, 2.5–35% by weight butadiene and 30–95% by weight of a normal alpha-monoolefin having 10–24 carbon atoms. which is useful as a pour point depressor.

This application is a division of application Ser. No. 272,217, filed Apr. 11, 1963 and now U.S. Pat. 3,393,057, issued July 16, 1968.

This invention relates to a novel hydrocarbon tri-polymer having utility as a mineral oil pour point depressor. More specifically, the present invention is directed to a pour depressor which is an oil-soluble tri-polymer of butadiene, a normal apha-olefin and styrene or indene.

It is known in the art to add pour depressors to mineral oil bases in order to permit their flow at low temperatures. Many different types of materials are known to depress the pour point of hydrocarbon oils but most have to be employed in disadvantageously large concentrations to provide the desired results. Moreover, although use of certain hydrocarbon polymers as pour depressors is known, most hydrocarbon polymers as demonstrated by U.S. Pat. No. 3,048,479 to Ilnyckyj et al, are not effective as pour point depressors and many in fact increase the pour point.

It has now been found that a base oil-soluble polymer of butadiene, a normal alpha-monoolefin hydrocarbon of 10 to 24, preferably 14 to 20 carbon atoms, and a compound selected from styrene, indene or their mixtures, which polymer is normally liquid and has a kinematic viscosity at 210° F. of at least about 35 centistokes, when added to a base mineral oil in small effective amounts substantially reduces the pour point of the oil and in many instances the cloud point.

The novel polymer of the present invention can be prepared by subjecting a mixture of styrene or indene, or their derivatives, such as the alkyl substituted numbers, the alpha alkene and butadiene or its adjacent homologues to a polymerization temperature of about 0 to 50° C., preferably 0 to 25° C. in the presence of the Friedel-Crafts catalyst such as aluminum chloride, aluminum bromide, titanium tetrachloride, boron tri-fluoride etherate, etc. The preferred catalysts are metal halides especially aluminum chloride. It is preferred that an inert diluent for the catalyst be also employed and when used will generally be present in an amount of about 0.5 to 5 volumes of diluent per volume of the styrene or indene-alpha olefin-butadiene feed. Suitable inert, normaly liquid diluents are, for instance, the non-polymerizable alkenes of say up to 10 carbon atoms of the lower alkyl halides of 1 to 3 carbon atoms as, for example, methyl chloride, ethyl chloride, propyl chloride and the like. The Friedel-Crafts catalyst will generally be present in the catalyst solution in a concentration of about 0.5 to 5%, preferably about 2 to 5%, by weight, and the total amount of the catalyst employed is generally about 0.1 to 15% by weight, preferably about 2 to 10% by weight of the polymer formed.

The styrene or indene component and butadiene in the reactant mixture, each constitutes about 2.5 to 35% by weight, preferably about 5 to 25% by weight, of the reactant mixture, while the normal alpha-olefin constitutes the essential balance, e.g. about 30% to 95% by weight, preferably about 50 to 90% by weight. Mixtures of normal alpha-olefins can be employed if desired and from the viewpoint of producing a more effective pour depressor, it is preferred when employing a mixture of the alpha olefins in the polymerization that it contains at least 30% by weight, preferably at least about 50 to 97% by weight based on the total alpha olefin mixture, of $C_{16}$ to $C_{18}$ alpha olefins. The proportions of butadiene, alpha olefin, and styrene or indene mixtures to catalyst solution employed may be about 0.5 to 1 part by weight of the mixture to 2.0 to 2.5 parts by weight of the catalyst solution.

It is preferred to form the polymer of the present invention by a simultaneous addition of the catalyst solution and the mixture of styrene or indene, butadiene and alpha-olefin to a reaction vessel in order to avoid monomeric polymerization of styrene or indene. The volumetric ratio of catalyst solution to the olefin reactants at a given unit of time is preferably about 2 to 1.

After the addition has been completed the polymerization is usually permitted to continue for a short period of time generally about 5 to 45 minutes to insure polymerization to a polymer product having a kinematic viscosity at 210° F. of say about 35 to 600 centistokes, preferably about 50 to 300 centistokes. The polymerization reaction can then be quenched using for instance a lower alkane or lower alkanol, e.g., of 1 to 4 carbon atoms. The resulting polymer can be separated from residual catalyst as by washing with water, alcohol, dilute aqueous caustic soda or other suitable hydrolyzing and washing methods. The polymerization product is a light colored, viscous oil.

Among the mineral bases which are improved in accordance with this invention are liquid petroleum oils boiling primarily above the gasoline range and include, for instance, lubricating oils, diesel fuels, fuel oils, etc. These oils are usually petroleum middle distillates and commonly have relatively high pour points, for instance at least about −10° F. or higher. The oils can be in their relatively crude state or they can be treated in accordance with well-known commercial methods such as acid or caustic treatment, solvent refining, clay treatment, etc. Fuel oils which can be improved by the polymers of this invention are, for instance, hydrocarbon fractions boiling primarily in the range of about 300° to 750° F. The fuel oils can be straight run distillate fuel oils, catalytically or thermally cracked distillate fuel oils or mixtures of straight run fuel oils, naphthas and the like with cracked distillate stocks. The cracked materials will frequently be about 15 to 70 volume percent of the fuel.

The amount of tri-polymer added to the base oils is dependent upon the particular oil employed, but in all cases will be that sufficient to reduce the pour point. Often the amounts used will fall in the range of about .01 to 1% by weight or more, preferably about 0.05 to 0.5% by weight of the oil, the latter component being the major component of the composition which may contain additives other than the tripolymer pour depressor.

The following examples are included to further illustrate the present invention.

EXAMPLE I

A 1-liter reaction flask was equipped with two dropping funnels and a Dry Ice trap to remove and condense from the polymerization system, the volatile ethyl chloride. One dropping funnel was charged with 126 ml. of a mixture of olefins consisting of 73.5% long chain alpha-olefins of the following approximate composition:

| | Percent |
|---|---|
| $C_{12}$ alpha-olefin | 7 |
| $C_{14}$ alpha-olefin | 16 |
| $C_{16}$ alpha-olefin | 40 |
| $C_{18}$ alpha-olefin | 30 |
| $C_{20}$ alpha-olefin | 7 |

10% styrene and 16.5% 1-3 butadiene. To the second dropping funnel was added 275 ml. of a saturated solution of $AlCl_3$ in ethyl chloride at 12° C. Both olefin and catalyst solution were added to the reaction flask at the same time, the olefin mixture at a rate of 15.8 ml./min., the catalyst solution at a rate of 34 ml./min. The temperature during the polymerization remained constant at 15° C. and the total time for addition of reactants was eight minutes. The polymerization was continued for an additional ten minutes, and 230 ml. of ethyl chloride was trapped from the system during the polymerization. Isopropyl alcohol (250 ml.) was added to quench the reaction, and 250 ml. of hexane to dilute the polymer. The polymer was washed with $H_2O$ and after being stripped of solvents had a kinematic viscosity at 210° F. of 338.68 centistokes and an iodine No. of 31.4. The polymer was blended in various amounts with a fuel oil and the pour point and cloud point of each blend determined. The fuel oil employed was a blend of 50% straight run gas oil and 50% catalytically cracked gas oil analyzing as follows:

| | |
|---|---|
| API ° gravity | 29.1 |
| Flash, Pensky-Martin, ° F. | 193 |
| ASTM distillation, ° F., IBP | 400 |
| 10% | 493 |
| 50% | 570 |
| 90% | 615 |

For comparison, determinations of the pour and cloud points of the fuel oil without the additive are included. The results are shown below:

| Percent Tri-Polymer | Pour point (° F.) | Cloud point (° F.) |
|---|---|---|
| 0.20 | −40 | 0 |
| 0.10 | −35 | +2 |
| 0.05 | −30 | +4 |
| 0.00 | 0 | +6 |

EXAMPLE II

The same equipment was used as in Example I. One dropping funnel was charged with 115 ml. of a mixture of olefins consisting of 81% 1-octadecene, 8% 1-3 butadiene, and 11% styrene. A second funnel was charged with 239 ml. of a saturated solution of $AlCl_3$ in ethyl chloride at 12° C. The reactants were added simultaneously, the olefin at a rate of 19 ml./min., the catalyst solution at a rate of 39.50 ml./min. The time for addition of reactants was six minutes, and the reaction was continued for an additional ten minutes. 180 ml. of ethyl chloride was trapped from the polymerization system and acted as a coolant to maintain a constant temperature. Isopropyl alcohol (250 ml.) was added to quench the catalyst and 250 ml. of hexane to dilute the polymer. After washing with $H_2O$, the polymer had a KV at 210° F. of 170.20 centistokes and an iodine number of 30. The polymer was blended in the fuel oil of Example I and the pour point and cloud point of each of the blends determined. The pour point and cloud point of the base fuel are included for comparison. The results are shown below.

| Percent Tri-Polymer | Pour point (° F.) | Cloud point (° F.) |
|---|---|---|
| 0.20 | −45 | 0 |
| 0.10 | −35 | +2 |
| 0.05 | −25 | +2 |
| 0.00 | 0 | +6 |

The data of Examples I and II demonstrate the advantageous pour properties of fuel oils of the novel tri-polymers of the present invention. The data shows that the novel tri-polymer also improves the cloud point.

EXAMPLE III

Substantially similar results to those of Example I can be obtained by use of a tri-polymer prepared as in Example I but substituting indene for the styrene.

We claim:
1. A normally liquid, oil-soluble tri-polymer of 2.5 to 35% by weight of a compound selected from the group consisting of styrene and indene, about 2.5 to 35% by weight of butadiene and about 30 to 95% by weight of normal alpha-monoolefin hydrocarbon having 10 to 24 carbon atoms, said tri-polymer having a kinematic viscosity at 210° F. of about 35 to 600 centistokes.

2. The tri-polymer of claim 1 having about 5 to 25% of a compound selected from the group consisting of styrene and indene, about 5 to 25% by weight butadiene and about 50 to 90% by weight normal alpha-monoolefin hydrocarbon having 14 to 20 carbon atoms.

3. The polymer of claim 2 wherein the normal alpha-monoolefin hydrocarbon is a mixture of normal alpha-monoolefin hydrocarbons having 14 to 20 carbon atoms and containing at least 30% by weight based on the total alpha-olefin mixture of $C_{16}$ to $C_{18}$ normal alpha-olefins.

References Cited

UNITED STATES PATENTS

| 3,271,468 | 9/1966 | Wilke et al. | 260—669 XR |
| 3,344,204 | 9/1967 | Clough et al. | 260—680 |
| 3,448,050 | 6/1969 | Young et al. | 260—669 XR |
| 3,450,786 | 6/1969 | Clough et al. | 260—669 |

DELBERT E. GANTZ, Primary Examiner

C. R. DAVIS, Assistant Examiner

U.S. Cl. X.R.

260—680